(12) United States Patent
Hwang et al.

(10) Patent No.: US 9,201,515 B2
(45) Date of Patent: Dec. 1, 2015

(54) DEVICE AND SYSTEM AND METHOD FOR INTERACTING WITH TARGET IN OPERATION AREA

(75) Inventors: Deng-Huei Hwang, New Taipei (TW); Tsang-Der Ni, Hsinchu (TW); Kwang-Sing Tone, Hsinchu (TW)

(73) Assignee: J-MEX, INC. (TW)

( * ) Notice: Subject to any disclaimer, the term of this patent is extended or adjusted under 35 U.S.C. 154(b) by 289 days.

(21) Appl. No.: 13/246,336

(22) Filed: Sep. 27, 2011

(65) Prior Publication Data

US 2012/0079433 A1    Mar. 29, 2012

(30) Foreign Application Priority Data

Sep. 28, 2010  (TW) .................................... 99132897

(51) Int. Cl.
*G06F 3/033* (2013.01)
*G09G 5/08* (2006.01)
*G06F 3/0346* (2013.01)
*G06F 3/0484* (2013.01)

(52) U.S. Cl.
CPC .......... *G06F 3/0346* (2013.01); *G06F 3/04842* (2013.01)

(58) Field of Classification Search
None
See application file for complete search history.

(56) References Cited

U.S. PATENT DOCUMENTS

| 2009/0249257 A1 | 10/2009 | Bove et al. |
| 2010/0136957 A1* | 6/2010 | Horodezky et al. ........ 455/414.2 |
| 2011/0169866 A1* | 7/2011 | Yoshikawa et al. ........... 345/660 |

FOREIGN PATENT DOCUMENTS

CN           101673168 A      3/2010

OTHER PUBLICATIONS

Office Action issued in corresponding Chinese Patent Application No. 201010540020 on Aug. 6, 2014, consisting of 7 pp.

* cited by examiner

*Primary Examiner* — Nicholas Lee
(74) *Attorney, Agent, or Firm* — Volpe and Koenig, P.C.

(57) ABSTRACT

A system for interacting with a target in an operation area having a selection tool includes an operating device. The operating device senses a motion to make a decision about whether the motion has a specific motion, and confirms whether the selection tool is located upon the target according to a distance between the selection tool and the target when the decision is positive.

21 Claims, 8 Drawing Sheets

DEVICE AND SYSTEM AND METHOD FOR INTERACTING WITH TARGET IN OPERATION AREA

CROSS-REFERENCES TO RELATED APPLICATIONS

This application claims the benefit of Taiwan Patent Application No. 099132897, filed on Sep. 28, 2010, in the Taiwan Intellectual Property Office, the disclosures of which are incorporated herein in their entirety by reference.

FIELD OF THE INVENTION

The present invention relates to a system implementing interaction by a motion, and more particularly to a device and system and method for interacting with a target in an operation area.

BACKGROUND OF THE INVENTION

For a long time, the plane-motion mouse device is operated on a table to control the computer cursor to select an icon or item. In the selection operation, the user should move the cursor to touch the icon by itself before carrying out the following operation of starting the icon function. That is to say, to successfully select the icon, the cursor touching the icon is a necessary condition. However, two operation considerations for achieving the necessary condition, motions of the cursor and the icon to be selected are completely and passively under the control of the user operation.

Please refer to FIG. 1, which is a schematic diagram showing a conventional operation process 10 for selecting an icon A1 by a cursor B1. In FIG. 1, the operation process 10 includes configurations 101, 102 and 103. In the configuration 101, the action point B1U of the cursor B1 is moved to the edge of the icon A1. In the configuration 102, the action point B1U of the cursor B1 is moved to the inside of the icon A1. In the configuration 103, when the action point B1U of the cursor B1 remains in the icon A1, an instruction can be utilized to select the icon A1. In general, in the operation as shown in FIG. 1, a two-dimensional plane mouse device is used to operate the cursor for selecting the icon A1. In general, the operation method will not perplex the user, because the plane mouse device is held and operated by the user's palm and wrist. When the plane mouse is working on the table, the palm and the wrist of holding and operating the mouse are supported by the arm sustained by the table, and thus an intuitive and coordinating cooperation among the eyes, the palm, the wrist and the arm makes the cursor B1 easily move to the icon A1 for completing the icon selection, which perplexes nothing to the user.

A technical scheme in the prior art disclosed in U.S. Patent Application Publication No. 2009/0249257 A1 provides a cursor navigation assistance. Please refer to FIG. 2, which is a schematic diagram showing a conventional operation configuration 201, for selecting an icon A1 by a cursor B1, disclosed in U.S. Patent Application Publication No. 2009/0249257 A1. In FIG. 2, the operation configuration 201 includes the icon A1, the cursor B1 and an interaction enabling area 25. For instance, the interaction enabling area 25 may enclose the icon A1. When the cursor B1 is moved to touch the interaction enabling area 25, the cursor B1 is automatically locked within the center region of the icon A1 in order to select the icon A1. In FIG. 2, to utilize the cursor B1 for making a click and selection to the icon A1, the cursor B1 is moved to contact the interaction enabling region 25 to enable the interaction between the cursor B1 and the icon A1. However, because the interaction enabling area 25 is preset, the effect thereof is similar to enlarging the area of the icon A1. In the application that the air mouse device is operated with a three-dimensional motion to control the cursor B1 for selecting the icon A1, the operation is equivalent to selecting an icon with a larger area by clicking. Therefore, when the air mouse device is operated with a three-dimensional motion, the scheme of the operation configuration 201 cannot reliably improve the problem resulting from the unavoidable hand motion including the unconscious motion or the thoughtless shake.

SUMMARY OF THE INVENTION

At present, the micro-gyroscope and the micro-accelerometer have been relatively widely applied to the computer field because of the progress of the micro-electro-mechanical technique, so that the three-dimensional air mouse device able to be kept off the table and operated in the air is developed in response thereto. The three-dimensional air mouse device or the so called air mouse device is operated with completely separating from the table and controls the cursor by the hand-held motion only to carry out the operation of selecting the icon on the screen. Because of exempting from the constraint of moving on the table, the air mouse device possesses very good motion freedom and convenience in operation. However, the hand also loses the support when operating the air mouse off the table, which results in the unnecessary motions of the hand of the user. For instance, either the thoughtless shake or the subconscious habit motion can cause an unexpected motion to the cursor and result in the operation deviation when selecting the icon. That is to say, the operation of positioning the cursor on the icon may have the situations of exceeding or fail to reach the limit, and more particularly the operation situation is happened when the area of the icon is smaller and the hand-held mouse in the air is used to position the cursor to the icon. Therefore, a lousy operation of repeating to aim the icon is unavoidable, and the good intention and the advantage of freely operating in the air are given at a great discount.

It is therefore an object of the present invention to provide an assignable interactive-operation starting distance, an assignable interactive area, an function of automatically starting an interactive operation, and a device, system and method for interacting with a target in an operation area to meet the abovementioned operation demand, and the user can define the interactive-operation starting distance by himself/herself to start the interactive-operation function for the system. The system provides a novel interactive-operation function to automatically start interaction between the cursor and the icon, so that the air mouse device is conveniently operated in the three-dimensional motion to control the cursor for making a click and selection to the icon.

It is therefore an aspect of the present invention to provide a system for interacting with a target in an operation area having a selection tool. The system includes an operating device. The operating device senses a motion to decide whether the motion has a specific motion. If the decision is positive, then according to a distance between the selection tool and the target to judge whether the selection tool is located upon the target.

It is therefore another aspect of the present invention to provide a device for interacting with a target in an operation area having a selection tool. The device includes a processing unit. The processing unit senses a motion to decide whether the motion has a specific motion, and sends out an instruction to determine a distance between the selection tool and the target so as to judge whether the selection tool is located upon the target.

It is therefore still another aspect of the present invention to provide a method for interacting with a target in an operation area having a selection tool. The method includes the following steps. A motion is sensed to decide whether the motion has a specific motion. When the decision is positive, it is confirmed that the selection tool is located upon the target.

BRIEF DESCRIPTION OF THE DRAWINGS

The foregoing and other features and advantages of the present invention will be more clearly understood through the following descriptions with reference to the drawings, wherein.

DETAIL DESCRIPTION OF THE PREFERRED EMBODIMENT

The present invention will now be described more specifically with reference to the following embodiments. It is to be noted that the following descriptions of preferred embodiments of this invention are presented herein for the purposes of illustration and description only; it is not intended to be exhaustive or to be limited to the precise form disclosed.

Figure 1:
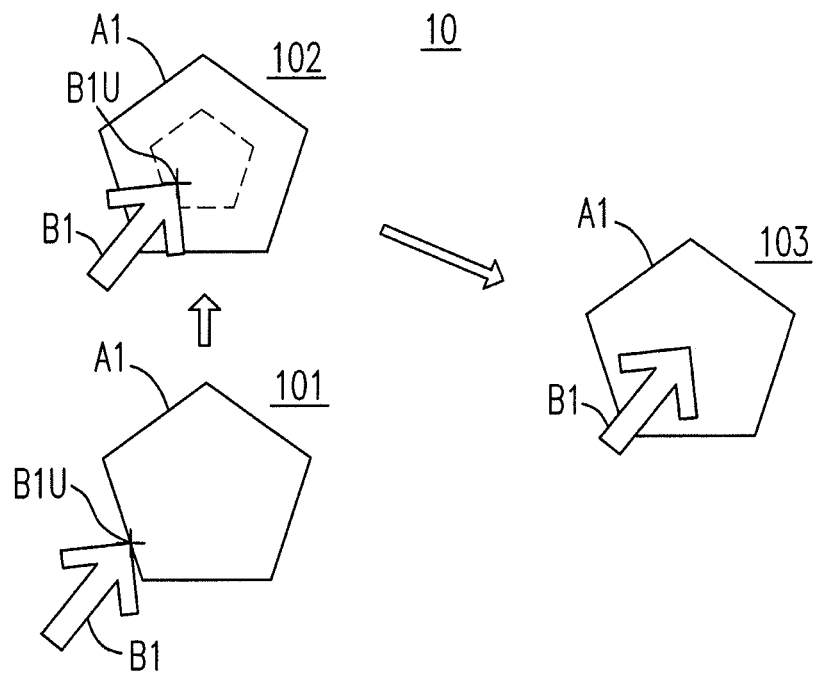
FIG. 1 is a schematic diagram showing a conventional operation process for selecting an icon by a cursor.
Figure 2:
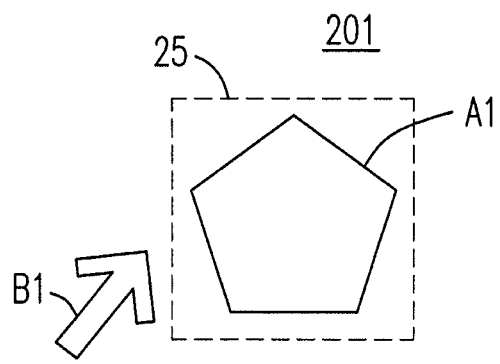
FIG. 2 is a schematic diagram showing a conventional operation configuration, for selecting an icon by a cursor, disclosed in U.S. Patent Application Publication No. 2009/0249257 A1.
Figure 3:
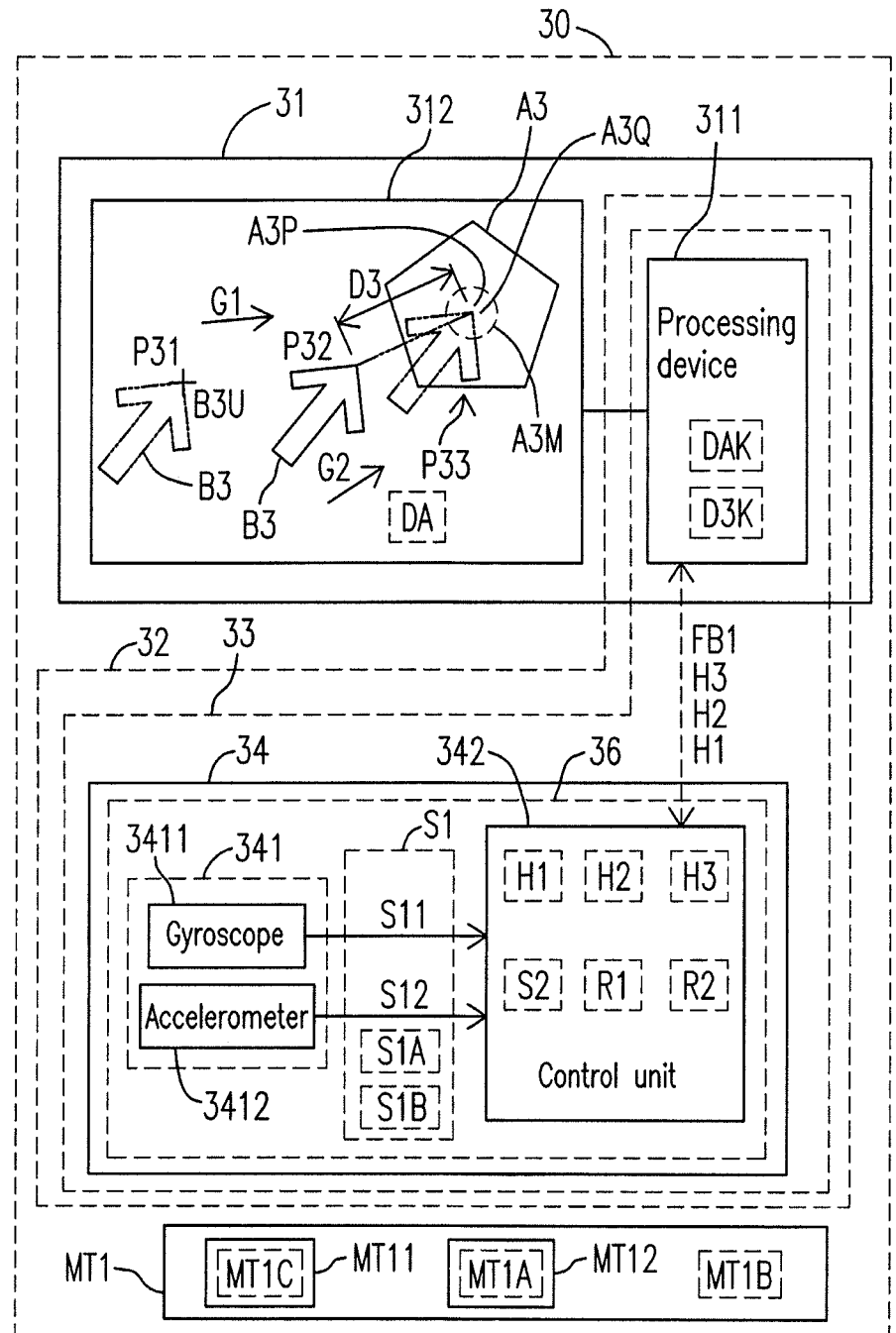
FIG. 3 is a schematic diagram showing a control system according to one embodiment of the present invention.

Please refer to FIG. 3, which is a schematic diagram showing a control system 30 according to one embodiment of the present invention. As shown, the control system 30 includes a display operating system 31 and an interacting system 32. The display operating system 31 includes a processing device 311 and an operation area 312. The operation area 312 has a target A3 and a selection tool B3, which are displayed therein. The display operating system 31 controls the display of the operation area 312. For instance, the display operating system 31 controls the target A3 and the selection tool B3 to be displayed in the operation area 312. For instance, the selection tool B3 may be a cursor or a pointer, and the target A3 may be an icon. The selection tool B3 may be controlled by the processing device 311 to move in the operation area 312. The operation area 312 may be a display area or a display operation area.

The display operating system 31 includes the operation area 312 and the target A3. The interacting system 32 includes an operating device 33 and may interactively operate with the display operating system 31. In one embodiment, the operating device 33 senses a motion MT1 to make a decision R1 about whether the motion MT1 has a specific motion MT1A, and confirms that the selection tool B3 is located upon the target A3 when the decision R1 is positive. In one embodiment, the operating device 33 senses the motion MT1 to make the decision R1 about whether the motion MT1 has the specific motion MT1A, and confirms that the selection tool B3 is located upon the target A3 according to a distance D3 between the selection tool B3 and the target A3 when the decision R1 is positive. For instance, the specific motion MT1A may be a specific angular motion or a motion component.

In one embodiment, the operating device 33 includes a control device 34 and a processing device 311 coupled to the control device 34. The control device 34 senses the motion MT1 to generate a signal S1, and analyzes the signal S1 to decide whether the signal S1 has a signal component S1A for making the decision R1. When the decision R1 is positive, the control device 34 generates an instruction H1. When the decision R1 is negative, the control device 34 continues to sense the motion MT1, wherein the signal component S1A is related to the specific motion MT1A. For instance, the control device 34 has the motion MT1, the signal component S1A represents the specific motion MT1A, and the specific motion MT1A is one selected from a group consisting of a roll motion, a yaw motion and a pitch motion.

In one embodiment, the processing device 311 causes the control system 30 to enter a first state in response to the instruction H1. In the first state, the processing device 311 determines the distance D3 between the selection tool B3 and the target A3. When the distance D3 is shorter than a threshold distance DA preset by the processing device 311, the processing device 311 confirms that the selection tool B3 is located upon the target A3. For instance, the processing device 311 presets the threshold distance DA by presetting a quantized distance DAK corresponding to the threshold distance DA, and determine the distance D3 to obtain a quantized distance D3K; when the quantized distance D3K is shorter than the quantized distance DAK, the processing device 311 confirms that the selection tool B3 is located upon the target A3. For instance, the control device 34 transmits the instruction H1 to the processing device 311. In one embodiment, when the distance D3 is shorter than the threshold distance DA, the processing device 311 judges that the selection tool B3 is located upon the target A3.

In one embodiment, when the decision R1 is negative, the control device 34 makes a decision R2 about whether the signal S1 has a signal component S1B. When the decision R2 is positive, the control device 34 generates an instruction H2 according to the signal S1, wherein the signal component S1B is related to a specific motion MT1B, or the signal component S1B represents the specific motion MT1B. For instance, the control device 34 presets each of the decision R1 and the decision R2 to be negative, the specific motion MT1A and the specific motion MT1B are perpendicular to each other, and the control device 34 transmits the instruction H2 to the processing device 311. The processing device 311 causes the selection tool B3 to make a movement G1 towards the target A3 in response to the instruction H2. If the decision R2 is positive, the motion MT1 may cause the selection tool B3 to make the movement G1 based on a first sensing sensitivity. For instance, the specific motion MT1B is one selected from a group consisting of a roll motion, a yaw motion and a pitch motion, and may be a specific angular motion or a motion component.

In one embodiment, the motion MT1 includes a sub-motion MT11, a sub-motion MT12 and the specific motion MT1B. The sub-motion MT12 may have the specific motion MT1A, the sub-motion MT11 may have a specific motion MT1C, and the specific motion MT1C and the specific motion MT1A are perpendicular to each other. For instance, the specific motion MT1C may be a specific angular motion or a motion component. When the selection tool B3 is located at a position P31 in the operation area 312, the control device 34 determines an initial posture of the sub-motion MT11 in response to an input and presets each of the decision R1 and the decision R2 to be negative, wherein the input may be a user input or a control command from the processing device 311. For instance, the position P31 is located outside the target A3; the selection tool B3 has an action point B3U; and when the action point B3U is located at the position P31, the control device 34 determines the initial posture of the sub-motion MT11. The control device 34 causes the decision R1 to be negative in response to the sub-motion MT11 so as to cause the selection tool B3 to move towards the target A3 from the position P31. When the selection tool B3 moves from the position P31 to a position P32, the control device 34 causes the decision R1 to be positive in response to the sub-motion MT12 so as to generate the instruction H1.

In one embodiment, when the action point B3U of the selection tool B3 is located at the position P32, the control system 30 enter the first state in response to the instruction H1. In the first state, the processing device 311 determines the distance D3 between the selection tool B3 and the target A3 to obtain the quantized distance D3K. For instance, the distance D3 is a distance between the action point B3U of the selection tool B3 and a reference position A3P of the target A3; preferably, the reference position A3P may be the centroid of the target A3; when the action point B3U of the selection tool B3 is located at the position P32, the distance D3 may be a distance between the position P32 and the centroid of the target A3.

In the first state, when the distance D3 is shorter than the threshold distance DA, the processing device 311 may make a first process, wherein the first process may include at least one selected from a group consisting of a first operation, a second operation and a third operation. The first operation is that of locking the selection tool B3 at a predetermined position A3Q of the target A3 for a predetermined time period. For instance, the predetermined position A3Q is located within a center region A3M of the target A3, and the action point B3U of the selection tool B3 is locked at the predetermined position A3Q. The second operation is that of confirming that the selection tool B3 selects the target A3. The third operation is that of leaving the first state. For instance, in the first state, when the quantized distance D3K is shorter than the quantized distance DAK, the processing device 311 may make the first process.

When the target A3 is selected, the control device 34 obtains a user input to instruct the processing device 311 to start a function associated with the target A3. In the first state, when the distance D3 is one of distances equal to and longer than the threshold distance DA, the processing device 311 may proceed to a second process, wherein the second process may include at least one selected from a group consisting of a fourth operation, a fifth operation and a sixth operation. The fourth operation is that of providing a feedback signal FB1 to the control device 34. The fifth operation is that of causing the selection tool B3 to further make a movement G2 towards the target A3 in response to the instruction H1, wherein the motion MT1 causes the selection tool B3 to make the movement G2 based on a second sensing sensitivity. For instance, the first sensing sensitivity is one of sensitivities the same as and different from the second sensing sensitivity. The sixth operation is that of leaving the first state. For instance, in the first state, when the quantized distance D3K is one of distances equal to and longer than the quantized distance DAK, the processing device 311 may make the second process.

As shown in FIG. 3, in one embodiment, the control device 34 is a device for interacting with the target A3 in the operation area 312. The control device 34 includes a processing unit 36. The processing unit 36 senses the motion MT1 to decide whether the motion MT1 has the specific motion MT1A, and sends out the instruction H1 to determine the distance D3 between the selection tool B3 and the target A3 so as to confirm whether the selection tool B3 is located upon the target A3. The processing unit 36 includes a sensing unit 341 and a control unit 342 coupled to the sensing unit 341. In one embodiment, the sensing unit 341 sensing the motion MT1 to generate the signal S1 including a sub-signal S11 and a sub-signal S12. The sensing unit 341 includes a gyroscope 3411 and an accelerometer 3412. The gyroscope 3411 senses the motion MT1 to generate the sub-signal S11, and the accelerometer 3412 senses the motion MT1 to generate the sub-signal S12.

In one embodiment, the control unit 342 coupled to the gyroscope 3411 and the accelerometer 3412 analyzes the signal S1 to make the decision R1 about whether the signal S1 has the signal component S1A related to the specific motion MT1A. When the decision R1 is positive, the control unit 342 generates the instruction H1. When the decision is negative, the control unit 342 makes the decision R2 about whether the signal S1 has a signal component S1B related to the specific motion MT1B. When the decision R2 is positive, the control unit 342 generates the instruction H2 according to the signal S1, wherein the specific motion MT1A is one selected from a group consisting of a roll motion, a yaw motion and a pitch motion, and the specific motion MT1A and the specific motion MT1B are perpendicular to each other. For instance, the control unit 342 presets the quantized distance DAK, presets each of the decision R1 and the decision R2 to be negative in response to an input, and then begins to decide whether the motion MT1 includes the specific motion MT1A, wherein the input may be a user input or a control command from the processing device 311. In one embodiment, in order to assign the decision R1, the control unit 342 analyzes the signal S1 to determine if the signal S1 is including the signal component S1A; in order to assign the decision R2, the control unit 342 determines if the signal S1 is including the signal component S1B when the decision R1 is negative.

In one embodiment, the instruction H2 causes the selection tool B3 to make the movement G1 towards the target A3, wherein the motion MT1 causes the selection tool B3 to make the movement G1 based on the first sensing sensitivity when the decision R2 is positive. The instruction H1 causes the distance D3 to be determined for making a third process, wherein the third process is one selected from a group consisting of a seventh operation and an eighth operation. The seventh operation is that the selection tool B3 automatically comes into contact with the target A3 when the distance D3 is shorter than the threshold distance DA. The eighth operation is that the selection tool B3 further makes the movement G2 towards the target A3 when the distance D3 is one of distances equal to and longer than the threshold distance DA, wherein the motion MT1 causes the selection tool B3 to make the movement G2 based on the second sensing sensitivity, and the first sensing sensitivity is one of sensitivities the same as and different from the second sensing sensitivity. In one embodiment, when the decision R1 is positive, the control unit 342 arranges an effective signal component ratio between the sub-signal S11 and the sub-signal S12 to generate a signal S2, and generates an instruction H3 according to the signal S2, wherein the instruction H3 instructs the selection tool B3 to move or further move towards the target A3.

In one embodiment implemented according to FIG. 3, the control device 34 is a device for interacting with the target A3 in the operation area 312. The control device 34 includes the processing unit 36. The processing unit 36 senses the motion MT1 and decides whether the motion MT1 includes the specific motion MT1A; that is, the processing unit 36 senses the motion MT1 to decide whether the motion MT1 has the specific motion MT1A. The processing unit 36 further sends out the instruction H1 to determine the distance D3 between the selection tool B3 and the target A3 so as to decide whether the selection tool B3 is located upon the target A3.

Figure 4:
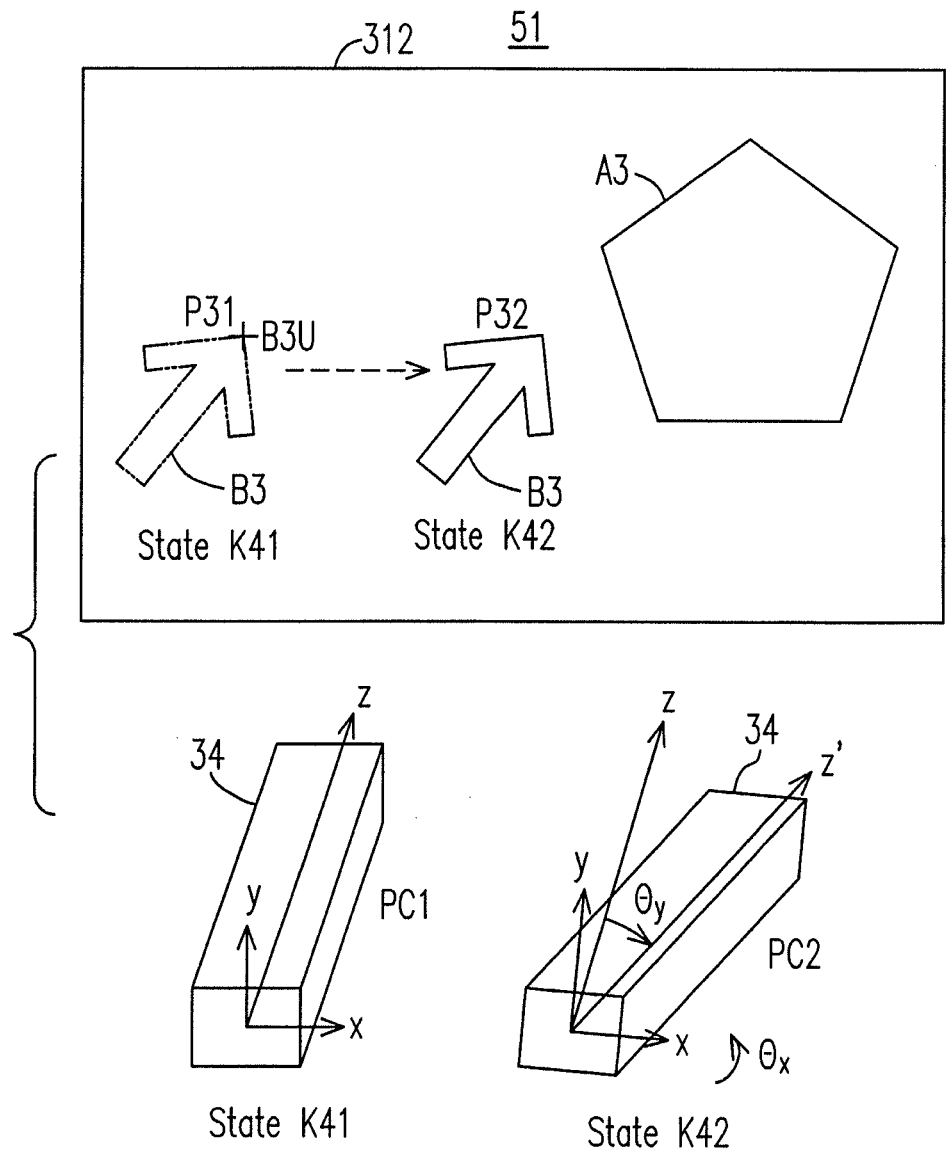
FIG. 4 is a schematic diagram showing a first configuration of the control system according to one embodiment of the present invention.

Please refer to FIG. 4, which is a schematic diagram showing a first configuration 51 of the control system 30 according to one embodiment of the present invention. As shown, the control system 30 has a state K41 and a state K42. For the descriptive purpose, the first configuration 51 shows the control device 34 when being in the state K41, the control device 34 when being in the state K42, and the operation area 312. There are the target A3, the selection tool B3 when being in the state K41, and the selection tool B3 when being in the state K42, descriptively displayed in the operation area 312. For instance, the target A3 is located at a relatively fixed position in the operation area 312, and the control device 34 controls the selection tool B3 to move in the operation area 312.

As shown in FIG. 4, in one embodiment, the control device 34 may be a hand-held control device, such as a remote controller, an air mouse device or a mobile phone. In the state K41, the control device 34 is located at any initial operation position PC1. The control device 34 is moved to a first motion position PC2 with a first motion, which causes the control system 30 to enter the state K42, wherein the first motion of the control device 34 is a yaw motion, a pitch motion, or a resultant motion of the yaw and the pitch motions. For instance, the first motion is the specific motion MT1C, which is a yaw motion component of the motion MT1, a pitch motion component of the motion MT1, or a resultant motion component of the yaw and the pitch motion components. For instance, the change in the angle $\theta_y$ around the y axis is used to express a yaw motion, and the change in the angle $\theta_x$ around the x axis is used to express a pitch motion.

A movement of the selection tool B3 corresponds to a motion of the control device 34. In the state K41, the selection tool B3 is located at any position P31 on the operation area 312 or in the operation area 312. For instance, the operation area 312 is located on a screen (not shown), and the action point B3U of the selection tool B3 is located at the position P31 in the state K41. When the control device 34 having the first motion causes the control system 30 to enter the state K42, the selection tool B3 is controlled by the first motion and moves to a position P32 in the operation area 312 with a horizontal motion, a vertical motion or a horizontal and vertical motion, wherein the first motion of the control device 34 is a yaw motion, a pitch motion, or a resultant motion of the yaw and the pitch motions. At this time, the selection tool B3 is in the state K42. For instance, the action point B3U of the selection tool B3 is located at the position P32 in the state K42, wherein the position P32 is a first operation point.

Figure 5:
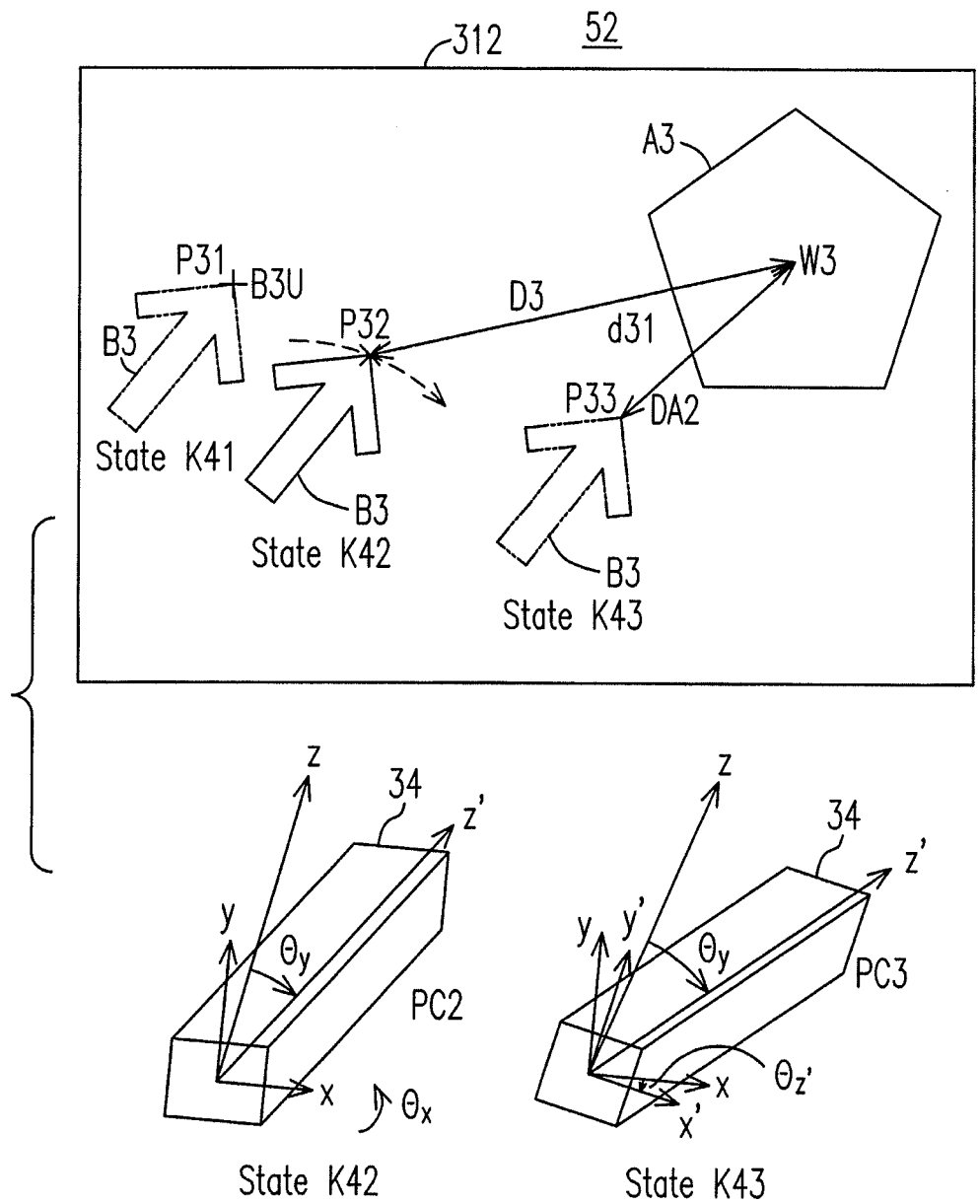
FIG. 5 is a schematic diagram showing a second configuration of the control system according to one embodiment of the present invention.

Please refer to FIG. 5, which is a schematic diagram showing a second configuration 52 of the control system 30 according to one embodiment of the present invention. As shown, the control system 30 has the state K41, the state K42 and a state K43. For the descriptive purpose, the second configuration 52 shows the control device 34 in the states K42 and K43, and the operation area 312. There are the target A3, the selection tool B3 in the states K41, K42 and K43, descriptively displayed in the operation area 312. The control device 34 controls the selection tool B3 to move in the operation area 312.

As shown in FIG. 5, in one embodiment, when the user wants the control system 30 to enter the state K42, the user can make an operation of a roll motion. In the mean time, the control device 34 receives the roll motion, and the gyroscope 3411, the accelerometer 3412 or both thereof in the control device 34 can sense the roll motion so as to generate an associated roll signal related to the roll motion. The associated roll signal is used to start an interaction operation function, which performs the operation of causing the selection tool B3 to fall upon the target A3, such as causing the cursor to fall upon the icon. For instance, the roll motion is the specific motion MT1A, which is a roll motion component of the motion MT1, and the associated roll signal is the signal component S1A of the signal S1. The control device 34 sends out the instruction H1 according to the associated roll signal to the processing device 311. The instruction H1 instructs the processing device 311 to start the interaction operation function. For instance, the processing device 311 has the interaction operation function, and the change in the angle θz' around the z' axis is used to express a roll motion.

In FIG. 5, there is the distance D3 between the selection tool B3 and the target A3. The screen is coupled to an electronic device, such as a personal computer. When the electronic device receives the instruction H1, the electronic device causes the control system 30 to enter the state K42 and the first state as the aforementioned in response to the instruction H1 and causes the processing device 311 to determine the distance D3, wherein the state K42 is an initial state of the first state. In the state K42, the selection tool B3 is located at the position P32, the distance D3 between the position P32 and the single target A3 is a distance d31, and the position P32 in the operation area 312 becomes an interaction starting point between the selection tool B3 and the target A3. At this time, the processing device 311 starts the interaction operation function causing the selection tool B3 to select the target A3, the distance D3 between the selection tool B3 and some specific point in the target A3 is the distance d31, and the distance d31 is the interaction starting distance.

In one embodiment, the processing device 311 decides whether the distance D3 is shorter than an interaction threshold distance DA2. When the distance D3 is shorter than the interaction threshold distance DA2, the processing device 311 automatically moves the selection tool B3 onto the target A3 and confirms that the selection tool B3 is located upon the target A3. When the distance D3 is one of distances equal to and longer than the interaction threshold distance DA2, the motion of the control device 34 may cause the selection tool B3 to continue to move towards the target A3. As shown in FIG. 5, when the control device 34 is moved to a second motion position PC3, the control device 34 causes the selection tool B3 to move to the position P33 and causes the control system 30 to enter the state K43. When the control system 30 is in the state K43, the distance D3 between the selection tool B3 and the target A3 is equal to the interaction threshold distance DA2. When the distance D3 continues to become shorter in response to the motion of the control device 34 and is shorter than the interaction threshold distance DA2, the selection tool B3 can be automatically moved onto the target A3 to cause the processing device 311 to confirm that the selection tool is located upon the target A3, thereby achieving the interaction selection operation between the selection tool B3 and the target A3. In one embodiment, the control device 34 sends out the instruction H1 according to the associated roll signal, and the specific point in the target may be the centroid of the area of the target A.

Figure 6:
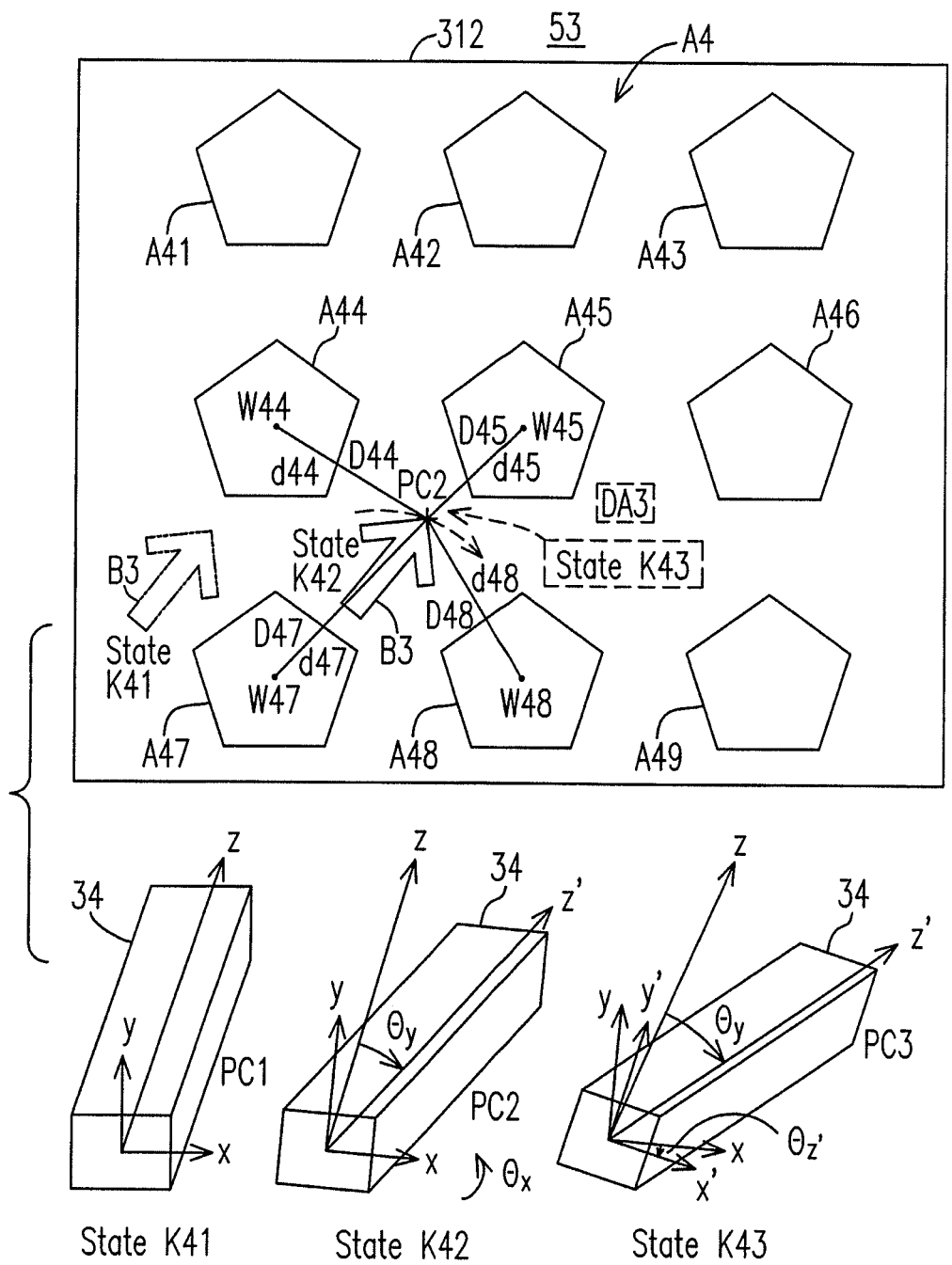
FIG. 6 is a schematic diagram showing a third configuration of the control system according to one embodiment of the present invention.

Please refer to FIG. 6, which is a schematic diagram showing a third configuration 53 of the control system 30 according to one embodiment of the present invention. As shown, the control system 30 has the state K41, the state K42 and a state K43. For the descriptive purpose, the third configuration 53 shows the control device 34 when being in the state K41, the control device 34 when being in the state K42, the control device 34 when being in the state K43, and the operation area 312. There are a plurality of targets A41, A42, A43, A44, A45, A46, A47, A48 and A49, the selection tool B3 when being in the state K41, and the selection tool B3 when being in the state K42, descriptively displayed in the operation area 312. For instance, the plurality of targets A41, A42, . . . , and A49 form an target array A4.

The plurality of targets A41, A42, . . . , and A49 are arranged to be separable from each other and do not adjoin each other. The operation features of the third configuration 53 are similar to those of the first configuration 51 and to those of the second configuration 52. The main operation features of the third configuration 53 are described as follows. There are distances D44, D45, D47 and D48 between the selection tool B3 and the respective targets A44, A45, A47 and A48. The processing device 311 causes the control system 30 to enter the first state in response to the instruction H1. In the first state, the processing device 311 determines the distances D44, D45, D47 and D48. When the control system 30 is in the state K42 and a roll motion is made to start an interaction starting point between the selection tool B3 and the plurality of targets A41, A42, . . . , and A49, the processing device 311 determines interaction starting distances d44, d45, d47 and d48 between the interaction starting point and the respective targets A44, A45, A47 and A48, wherein the targets A44, A45, A47 and A48 surround the interaction starting point.

For instance, the targets A44, A45, A47 and A48 have centroids W44, W45, W47 and W48, respectively. The interaction starting distances d44, d45, d47 and d48 are distances between the interaction starting point and the respective centroids W44, W45, W47 and W48. Afterwards, when the selection tool B3 moves in response to the motion of the control device 34, the distances D44, D45, D47 and D48 continue to vary respectively from the interaction starting distances d44, d45, d47 and d48. When the shortest distance (such as D45) in the distances D44, D45, D47 and D48 is shorter than an interaction threshold distance DA3, the selection tool B3 can be fallen upon the target A45 to cause the processing device 311 to confirm that the selection tool is located upon the target A3; that is, the selection tool B3 is automatically moved onto the target A3 for achieving the interaction selection operation between the selection tool B3 and the target A45. Preferably, the processing device 311 presets the interaction threshold distance DA3.

Figure 7A:
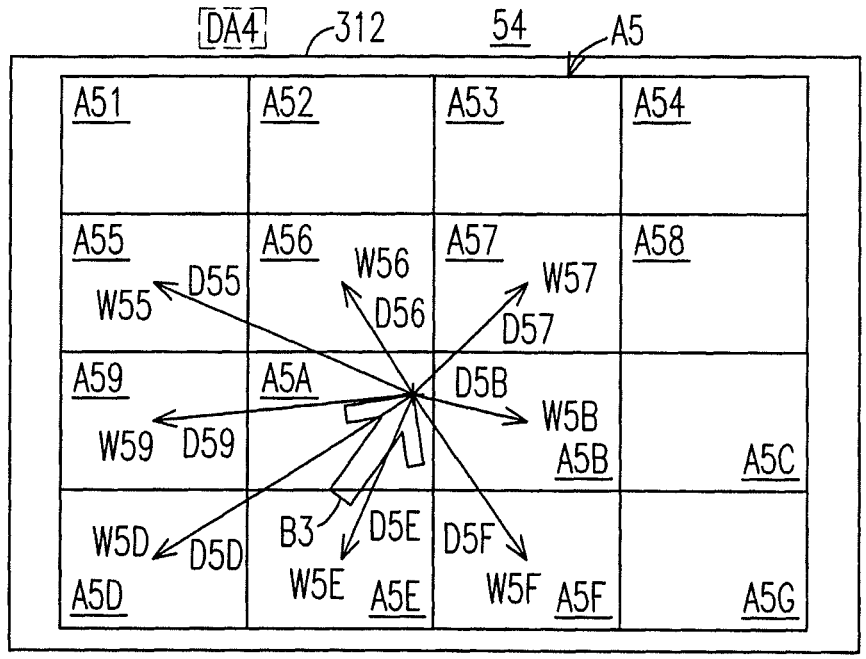
FIG. 7(a) and FIG. 7(b) are schematic diagrams respectively showing a fourth configuration and a fifth configuration of the control system according to one embodiment of the present invention.
Figure 7B:
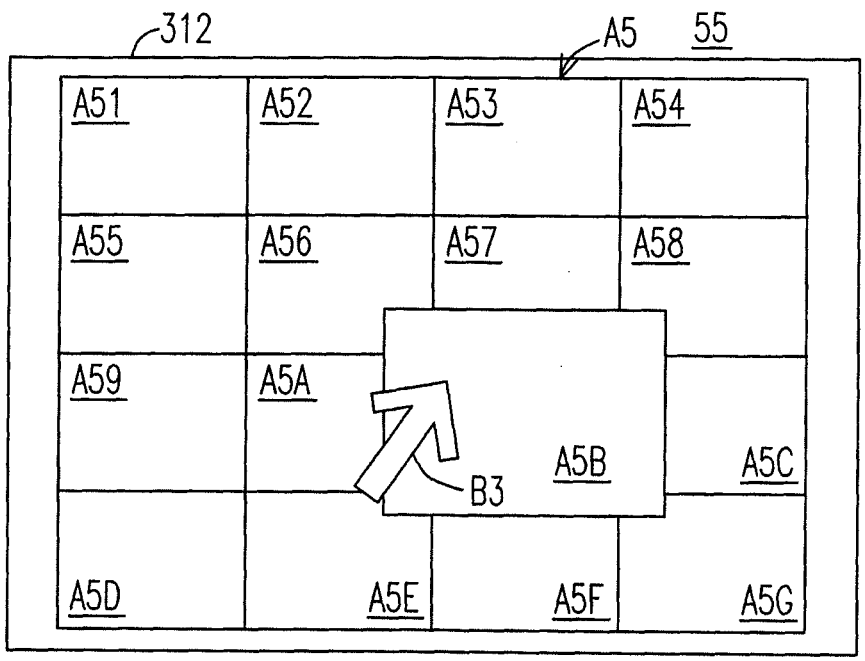

Please refer to FIG. 7(a) and FIG. 7(b), which are schematic diagrams respectively showing a fourth configuration 54 and a fifth configuration 55 of the control system 30 according to one embodiment of the present invention. As shown in FIG. 7(a), the fourth configuration 54 shows the operation area 312. There are a plurality of targets A51, A52, A53, A54, A55, A56, A57, A58, A59, A5A, A5B, A5C, A5D, A5E, A5F and A5G, and the selection tool B3 when being in the state K42, displayed in the operation area 312, wherein the plurality of targets A51, A52, . . . , and A5G form an target array A5. Any two neighboring targets of the plurality of targets A51, A52, . . . , and A5G are arranged to adjoin each other and have no gap therebetween.

The operation features of the fourth configuration 54 are similar to those of the third configuration 53, and the main operation features of the fourth configuration 54 are described as follows. The targets A55, A56, A57, A59, A5B, A5D, A5E and A5F have centroids W55, W56, W57, W59, W5B, W5D, W5E and W5F, respectively. There are distances D55, D56, D57, D59, D5B, D5D, D5E and D5F between the action point B3U of the selection tool B3 and the respective centroids W55, W56, W57, W59, W5B, W5D, W5E and W5F. The processing device 311 causes the control system 30 to enter the first state in response to the instruction H1. When the control system 30 enters the first state, the action point B3U of the selection tool B3 is located in the target A55 and located at the position in the operation area 312. The targets A55, A56, A57, A59, A5B, A5D, A5E and A5F surround an interaction starting point. In the first state, the processing device 311 determines the distances D55, D56, D57, D59, D5B, D5D, D5E and D5F.

When the selection tool B3 moves in response to the motion of the control device 34, the distances D55, D56, D57, D59, D5B, D5D, D5E and D5F continue to vary respectively. When the shortest distance (such as D5B) in the distances D55, D56, D57, D59, D5B, D5D, D5E and D5F is shorter than an interaction threshold distance DA4, the selection tool B3 can be located upon the target A5B so as to achieve the interaction selection operation between the selection tool B3 and the target A5B. As shown in the fifth configuration 55 of FIG. 7, when the selection tool B3 selects the target A5B, the target A5B can be displayed with the conditions that the color of the target A5B is changed into inverse video and the area of the target A5B is enlarged.

In one embodiment implemented according to FIG. 4, FIG. 5, FIG. 6, FIG. 7(a) and FIG. 7(b), when the selection tool B3 selects one desired target, the user may start a function associated with the desired target by an operation, wherein the operation is one selected from a group consisting of: pushing a pushbutton (not shown) on the control device 34; and making a gesture, such as a swing, a shake or a roll motion with a direction reverse to the direction of the previous roll motion of the roll motion.

Figure 8:
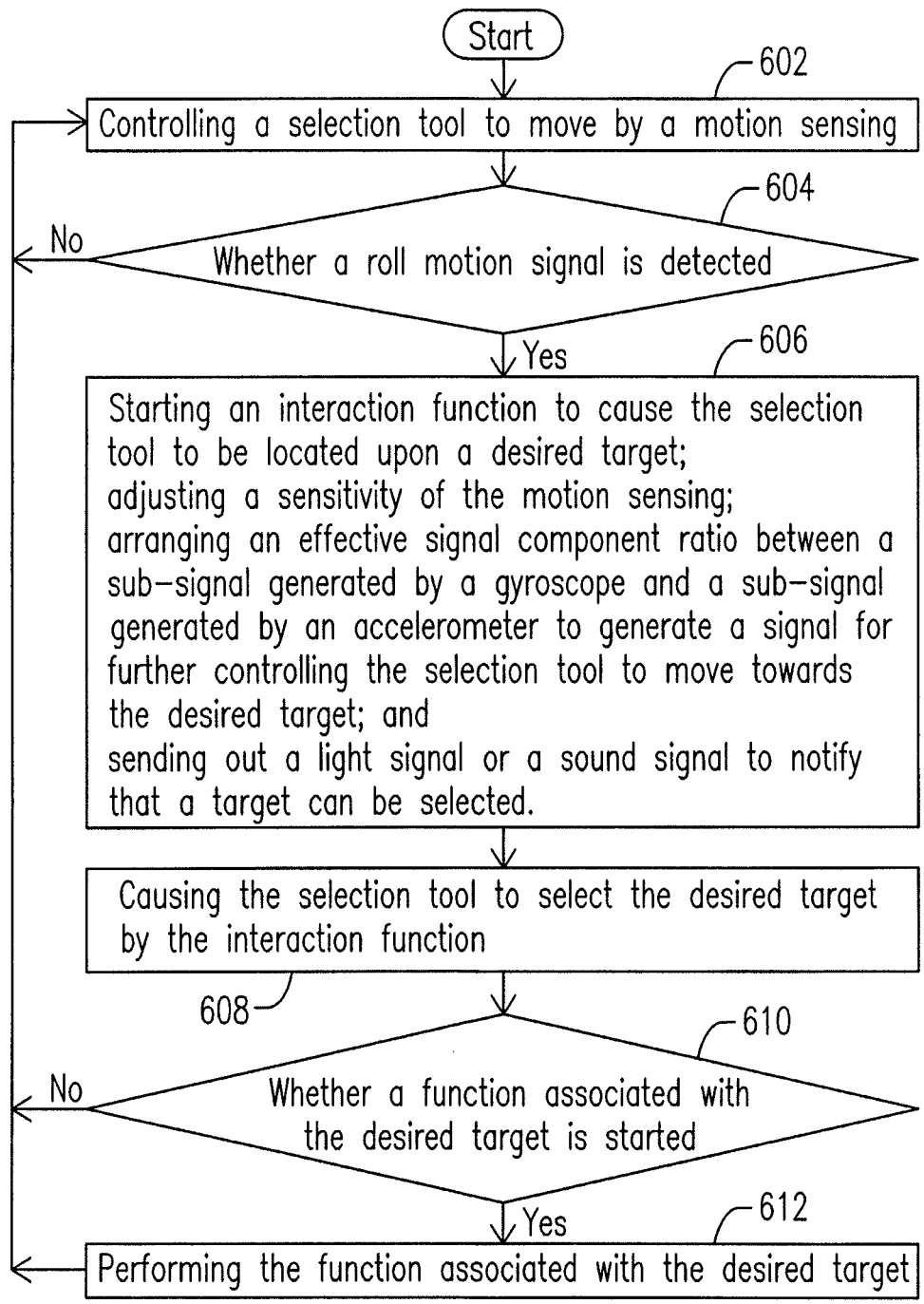
FIG. 8 is a schematic diagram showing an interaction operation flow of the control system according to one embodiment of the present invention.

Please refer to FIG. 8, which is a schematic diagram showing an interaction operation flow of the control system 30 according to one embodiment of the present invention. As shown, in Step 602, the selection tool B3 is controlled to move by a motion sensing. For instance, the motion sensing is a three-dimensional motion sensing. In Step 604, whether a roll motion signal is detected is decided to obtain a first decision result, wherein the roll motion signal may be a signal component of the signal S1. Under a condition that the first decision result is positive, the flow proceeds to Step 606. Under a condition that the first decision result is negative, the flow goes back to Step 602.

In Step 606, a first, a second, a third and a fourth sub-steps thereof may be performed as follows. In the first sub-step, an interaction function is started to cause the selection tool B3 to be located upon the desired target. In the second sub-step, the sensitivity of the motion sensing is adjusted (increased/reduced). For instance, the gyroscope 3411, the accelerometer 3412 or both thereof of the control device 34 makes the motion sensing, wherein the gyroscope 3411 senses the motion MT1 to generate the sub-signal S11, and the accelerometer 3412 senses the motion MT1 to generate the sub-signal S12. In the third sub-step, the effective signal component ratio between the sub-signal S11 and the sub-signal S12 is arranged to generate the signal S2, and the selection tool B3 is controlled to further move towards the desired target according to the signal S2. In the fourth sub-step, a light signal or a sound signal is sent out to notify that a target can be selected. In one embodiment, the abovementioned second, third and fourth sub-steps may be selectively performed.

In Step 608, the selection tool B3 is caused to select the desired target by the interaction function. In Step 610, whether a function associated with the desired target is started is decided to obtain a second decision result; for instance, a gesture or a motion is used to start the function. Under a condition that the second decision result is positive, the flow proceeds to Step 612. Under a condition that the second decision result is negative, the flow goes back to Step 602. In Step 612, the function associated with the desired target is performed.

In one embodiment implemented according to FIG. 8, when a roll motion is detected, the sensing sensitivity of the three-dimensional motion sensing module may be adjusted. For instance, the sensing sensitivity of the gyroscope or the accelerometer may be reduced by adjusting, so that the user may operate the selection tool to approach the target by a larger action of the control device until the interaction function for causing the selection tool to be located upon the target is started, thereby achieving the selection operation between the selection tool and the target. Otherwise, the sensing sensitivity may be increased by adjusting, so that the user may cause the selection tool to quickly approach the target by a small-range motion of the control device so as to achieve the selection operation between the selection tool and the target; this operation way is particularly fit for the user whose hand motion is aptly controlled by itself.

In one embodiment implemented according to FIG. 8, the gyroscope and the accelerometer in the three-dimensional motion sensing module output the first sub-signal and the second sub-signal, respectively. When a roll motion is detected, an effective signal component ratio between the first sub-signal and the second sub-signal S12 is arranged to generate an arranged signal. For instance, in the first extreme condition, the input ratio which the first sub-signal is input to the arranged signal may be set to 0; that is, after that, the three-dimensional motion sensing module only can detect the roll motion of the control device; that is, starting from this time, only the wrist rotation operation can effectively control the selection tool to move, so that the swing motion (yaw/pitch motion) with the horizontal/vertical rotation of the arm in the original condition is transitioned into a motion which only has a wrist rotation. That is to say, in the operation, the user experiences an analogous slowdown motion, which a quick swing motion of the arm is transitioned into a wrist motion to start the interaction operation function between the selection tool and the target, so as to ease the user to precisely control the selection tool to move towards the target until the interaction operation function is finished. Otherwise, in the second extreme condition, the input ratio which the second sub-signal is input to the arranged signal may be set to 0; in other words, the sensing function of the accelerometer is turned off; at this time, the user utilizes the control device 34 to sense the motion only by the gyroscope. In the second extreme condition, the operation way for the interaction operation function between the selection tool and the target from the starting time to the ending time is kept to be consistent with that prior to starting the interaction operation function, so that the user can locate the selection tool upon the target in one single operation.

Figure 9:
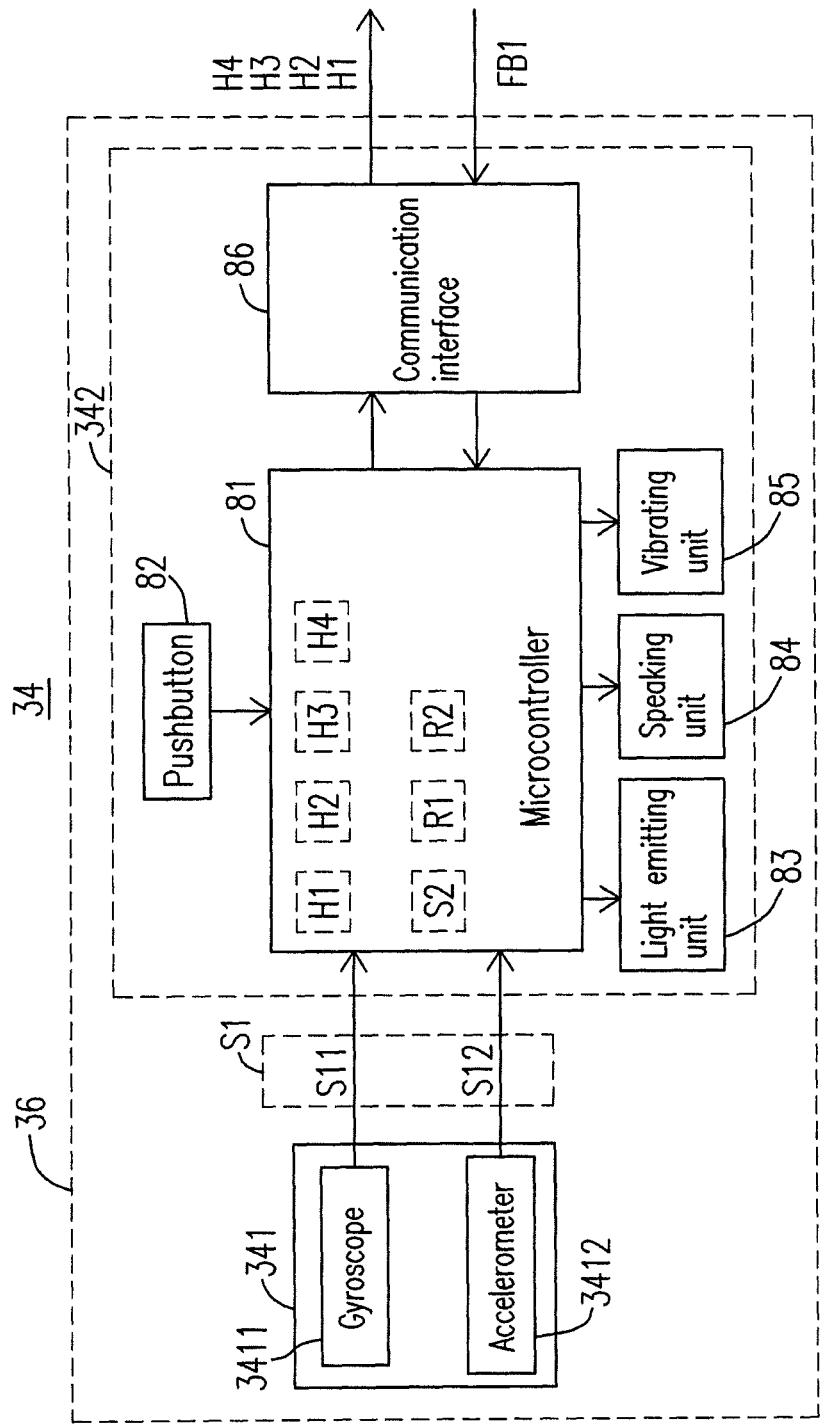
FIG. 9 is a schematic diagram showing a structure of a control device according to one embodiment of the present invention.

Please refer to FIG. 9, which is a schematic diagram showing a structure of the control device 34 according to one embodiment of the present invention. As shown, the control device 34 includes the processing unit 36. The processing unit 36 includes the sensing unit 341 and the control unit 342 coupled to the sensing unit 341. In one embodiment, the sensing unit 341 sensing the motion MT1 to generate the signal S1, wherein the signal S1 includes the sub-signal S11 and the sub-signal S12. The sensing unit 341 includes the gyroscope 3411 and the accelerometer 3412. The gyroscope 3411 senses the motion MT1 to generate the sub-signal S11, and the accelerometer 3412 senses the motion MT1 to generate the sub-signal S12.

The control unit 342 includes a microcontroller 81, a pushbutton 82, a light emitting unit 83, a speaking unit 84, a vibrating unit 85 and a communication interface 86. The microcontroller 81 is coupled to the gyroscope 3411, the accelerometer 3412, the pushbutton 82, the light emitting unit 83, the speaking unit 84, the vibrating unit 85 and the communication interface 86. The communication interface 86 may includes at least one selected from a group consisting of a radio frequency module, a Bluetooth module and a universal series bus module. The microcontroller 81 receives the signal S1, determines the signal S2, the decision R1, the decision R2 and the instructions H1, H2 and H3 separately in response to the signal S1, and transmits the respective instructions H1, H2 and H3 to the processing device 311 through the communication interface 86.

The communication interface 86 receives the feedback signal FB1 from the processing device 311, and forwards the feedback signal FB1 to the microcontroller 81. The microcontroller 81 may generate an instruction H4 according to the feedback signal FB1, and transmits the instruction H4 to the processing device 311 through the communication interface 86 for controlling the interaction operation between the selection tool B3 and the target A3. The microcontroller 81 may drive at least one selected from a group consisting of the light emitting unit 83, the speaking unit 84 and the vibrating unit 85. As described in the aforementioned, when the selection tool B3 selects the desired target, the user may utilizes the control device 34 to start a function associated with the desired target by an operation, wherein the operation is one selected from a group consisting of: pushing the pushbutton 82 on the control device 34; and making a gesture, such as a swing, a shake or a roll motion with a direction reverse to the direction of the previous roll motion of the roll motion.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims, which are to be accorded with the broadest interpretation so as to encompass all such modifications and similar structures.

What is claimed is:

1. A system for interacting with a first target in an operation area having a selection tool, the system comprising:
an operating device including a sensing unit to sense a first motion, to generate a first signal, and to make a first decision about whether the first motion has a first specific motion, wherein:
the first signal includes a first sub-signal and a second sub-signal;

when the first decision is negative, the operating device moves the selection tool towards the first target according to the first signal; and when the first decision is positive, the operating device arranges an effective signal component ratio between the first sub-signal and the second sub-signal to generate a second signal different from the first signal, moves the selection tool towards the first target according to the second signal, determines a first distance between the moved selection tool and the first target, and confirms whether the selection tool is located upon the first target according to a comparison between the first distance and a threshold distance.

2. The system according to claim 1, wherein the operating device comprises:

a control device sensing the first motion to generate the first signal, analyzing the first signal to decide whether the first signal has a first signal component related to the first specific motion for making the first decision, generating a first instruction when the first decision is positive, and continuing to sense the first motion when the first decision is negative; and a processing device causing the operating device to enter a first state in response to the first instruction, determining a second distance between the selection tool and the first target in the first state, and confirming that the selection tool is located upon the first target when the second distance is shorter than the threshold distance.

3. The system according to claim 2, wherein:

the processing device presets the threshold distance;

the control device further makes a second decision about whether the first signal has a second signal component related to a second specific motion when the first decision is negative, and generates a second instruction according to the first signal when the second decision is positive, wherein the first specific motion is one selected from a group consisting of a roll motion, a yaw motion and a pitch motion, and the first and the second specific motions are perpendicular to each other;

the processing device causes the selection tool to make a first movement towards the first target in response to the second instruction, wherein the first motion causes the selection tool to make the first movement based on a first sensing sensitivity when the second decision is positive;

the first motion includes a first sub-motion and a second sub-motion having the first specific motion, and the first sub-motion has a third specific motion perpendicular to the first specific motion;

the control device determines an initial posture of the first sub-motion when the selection tool is located at a first position in the operation area;

the control device causes the first decision to be negative in response to the first sub-motion so as to cause the selection tool to move towards the first target from the first position;

when the selection tool moves from the first position to a second position, the control device causes the first decision to be positive in response to the second sub-motion so as to generate the first instruction;

the processing device makes a first process when the second distance is shorter than the threshold distance in the first state, wherein the first process includes at least one selected from a group consisting of:

locking the selection tool at a predetermined position of the first target for a predetermined time period;

confirming that the selection tool selects the first target; and leaving the first state;

when the first target is selected, the control device obtains a user input to instruct the processing device to start a function associated with the first target; and the processing device makes a second process when the second distance is one of distances equal to and longer than the threshold distance in the first state, wherein the second process includes at least one selected from a group consisting of:

providing a feedback signal to the control device;

causing the selection tool to further make a second movement towards the first target in response to the first instruction, wherein the first motion causes the selection tool to make the second movement based on a second sensing sensitivity; and leaving the first state.

4. The system according to claim 3, wherein:

the operation area is a display area;

the selection tool has an action point and is a cursor;

the first target has a centroid and a center region and is an icon;

the first position is located outside the first target;

the second distance is a distance between the action point of the selection tool and the centroid of the first target;

the predetermined position is located within the center region of the first target; and the first sensing sensitivity is one of sensitivities the same as and different from the second sensing sensitivity.

5. The system according to claim 3, wherein the operation area further has at least a second target located therein, and the operating device further confirms whether the selection tool is located upon one of the first target and the second target according to the second distance and a third distance between the selection tool and the second target.

6. The system according to claim 5, wherein the operation area further has a third target located therein, and the first position is located in the third target when the first target and the second target are near to the third target and surround the third target.

7. The system according to claim 3, wherein the control device comprises:

the sensing unit comprising:

a gyroscope sensing the first motion to generate the first sub-signal; and an accelerometer sensing the first motion to generate the second sub-signal; and a control unit coupled to the gyroscope and the accelerometer, analyzing the first signal to decide whether the first signal has the first signal component for making the first decision, generating the first instruction according to the first signal when the first decision is positive, making the second decision according to the first signal when the first decision is negative, and generating a second instruction according to the first signal when the second decision is positive.

8. The system according to claim 7, wherein the control unit arranges the effective signal component ratio between the first sub-signal and the second sub-signal to generate the second signal when the first decision is positive.

9. The system according to claim 8, wherein the control unit further generates a third instruction according to the second signal, and the third instruction instructs the selection tool to move towards the first target.

10. A device for interacting with a first target in an operation area having a selection tool the device comprising:

a processing unit sensing a first motion to make a first decision about whether the first motion has a first specific motion, generating a first instruction when the first decision is positive, and sending out the first instruction to determine a first distance between the selection tool and the first target so as to confirm whether the selection tool is located upon the first target, wherein:

the first motion is sensed to generate a first signal;

the processing unit decides whether the first signal has a first signal component related to the first specific motion for making the first decision, makes a second decision as to whether the first signal has a second signal component related to a second specific motion, different from the first specific motion, when the first decision is negative, and generates a second instruction according to the first signal when the second decision is positive;

the second instruction causes the selection tool to make a first movement towards the first target, wherein the first motion causes the selection tool to make the first movement based on a first sensing sensitivity when the second decision is positive; and the first instruction causes the first distance to be determined for causing the selection tool to further make a second movement towards the first target when the first distance is not less than a threshold distance, wherein the first motion causes the selection tool to make the second movement based on a second sensing sensitivity, different from the first sensing sensitivity.

11. The device according to claim 10, wherein the processing unit comprises:

a sensing unit sensing the first motion to generate a first signal, wherein the first signal includes a first sub-signal and a second sub-signal, and the sensing unit includes:
  a gyroscope sensing the first motion to generate the first sub-signal; and
  an accelerometer sensing the first motion to generate the second sub-signal; and
  a control unit coupled to the gyroscope and the accelerometer, analyzing the first signal to decide whether the first signal has a first signal component related to the first specific motion for making the first decision, generating the first instruction when the first decision is positive, making a second decision about whether the first signal has a second signal component related to a second specific motion when the first decision is negative, and generating the second instruction according to the first signal when the second decision is positive, wherein the first specific motion is one selected from a group consisting of a roll motion, a yaw motion and a pitch motion, and the first and the second specific motions are perpendicular to each other.

12. The device according to claim 11, wherein the first distance is determined for causing the selection tool to automatically contact the first target when the first distance is less than the threshold distance.

13. The device according to claim 11, wherein:
the control unit further arranges an effective signal component ratio between the first sub-signal and the second sub-signal to generate a second signal when the first decision is positive, and generates a third instruction according to the second signal, wherein the third instruction instructs the selection tool to further move towards the first target.

14. A method for interacting with a first target in an operation area having a selection tool, the method comprising steps of:

providing a control device having a first motion;

causing the selection tool to make a first movement towards the first target, wherein the selection tool is caused to make the first movement based on a first sensing sensitivity for sensing the first motion;

sensing the first motion to make a first decision about whether the first motion has a first specific motion;

adjusting the first sensing sensitivity to a second sensing sensitivity for sensing the first motion when the first decision is positive; and causing the selection tool to make a second movement towards the first target based on the second sensing sensitivity so as to confirm that the selection tool is located upon the first target, wherein:
  the selection tool makes the first movement when the first motion has a third movement;
  the selection tool makes the second movement when the first motion has a fourth movement; and
  the fourth movement is one of being quicker and slower than the third movement under a condition that the second movement is as fast as the first movement.

15. The method according to claim 14, further comprising steps of:

presetting a threshold distance;

generating a first signal by sensing the first motion;

analyzing the first signal to decide whether the first signal has a first signal component related to the first specific motion for making the first decision;

generating a first instruction when the first decision is positive;

making a second decision about whether the first signal has a second signal component related to a second specific motion when the first decision is negative, wherein the first specific motion is one selected from a group consisting of a roll motion, a yaw motion and a pitch motion, and the first and the second specific motions are perpendicular to each other; and generating a second instruction according to the first signal when the second decision is positive, wherein the first motion causes the selection tool to make the first movement based on the first sensing sensitivity when the second decision is positive.

16. The method according to claim 15, wherein the operation area has a first position, and the first motion includes a first sub-motion and a second sub-motion having the first specific motion, and the first sub-motion has a third specific motion perpendicular to the first specific motion, the method further comprising steps of:

entering a first state in response to the first instruction;

determining an initial posture of the first sub-motion when the selection tool is located at the first position in the operation area;

causing the first decision to be negative in response to the first sub-motion so as to cause the selection tool to move towards the first target from the first position;

when the selection tool moves from the first position to a second position, causing the first decision to be positive in response to the second sub-motion so as to generate the first instruction;

determining a first distance between the selection tool and the first target in the first state;

making a first process when the first distance is shorter than the threshold distance in the first state, wherein the first process includes at least one selected from a group consisting of:
  locking the selection tool in a predetermined position of the first target for a predetermined time period;

confirming that the selection tool selects the first target; and leaving the first state;

when the first target is selected, starting a function associated with the first target by obtaining a user input; and making a second process when the first distance is one of distances equal to and longer than the threshold distance in the first state, wherein the second process includes at least one selected from a group consisting of:

providing a feedback signal;

the step of causing the selection tool to make the second movement towards the first target in response to the first instruction, wherein the first motion causes the selection tool to make the second movement based on the second sensing sensitivity; and leaving the first state.

17. The method according to claim 16, wherein:
the operation area is a display area;
the selection tool has an action point and is a cursor;
the first target has a centroid and a center region and is an icon;
the first position is located outside the first target;
the first distance is a distance between the action point of the selection tool and the centroid of the first target;
the predetermined position is located within the center region of the first target; and
the first sensing sensitivity is different from the second sensing sensitivity.

18. The method according to claim 16, wherein the operation area further has at least a second target located therein, and the method further comprises a step of confirming whether the selection tool is located upon one of the first target and the second target according to the first distance and a second distance between the selection tool and the second target.

19. The method according to claim 18, wherein:
the operation area further has a third target located therein; and
the first position is located in the third target when the first target and the second target are near to the third target and surround the third target.

20. The method according to claim 15, wherein the first signal includes a first sub-signal generated by a gyroscope and a second sub-signal generated by an accelerometer, and the method further comprises steps of:

arranging an effective signal component ratio between the first sub-signal and the second sub-signal to generate a second signal when the first decision is positive, and generating a third instruction according to the second signal, wherein the third instruction instructs the selection tool to further move towards the first target.

21. A device for interacting with a target in an operation area having a selection tool, the device comprising:

a processing unit sensing a first motion to generate a first signal, and to make a decision about whether the first motion has a specific motion, wherein:

the first signal includes a first sub-signal and a second sub-signal;

when the decision is negative, the processing unit causes the selection tool to move towards the target according to the first signal; and when the decision is positive, the processing unit sends out a first instruction to determine a first distance between the selection tool and the target, arranges an effective signal component ratio between the first sub-signal and the second sub-signal to generate a second signal different from the first signal, and generates a second instruction according to the second signal, wherein the second instruction instructs the selection tool to move towards the target to form a second distance between the moved selection tool and the target so as to confirm whether the selection tool is located upon the target according to a comparison between the second distance and a threshold distance.

* * * * *